United States Patent Office 3,121,648
Patented Feb. 18, 1964

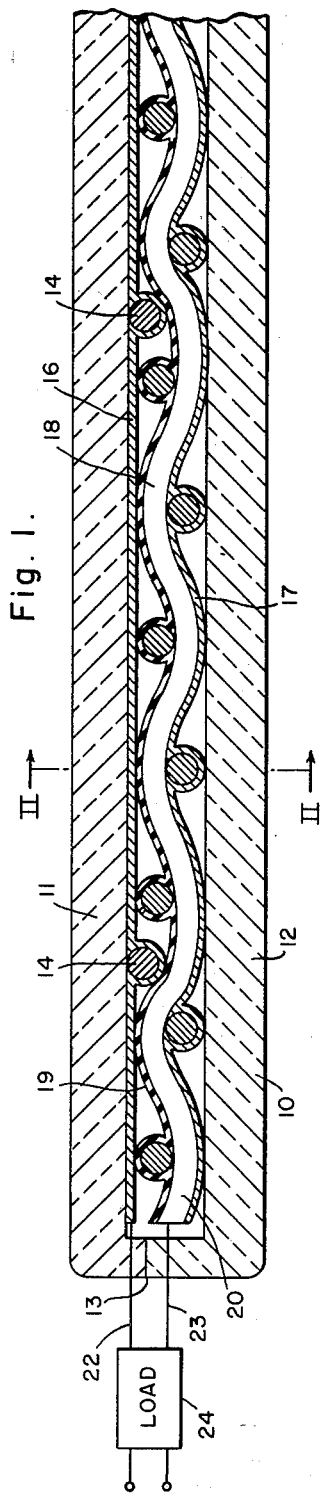
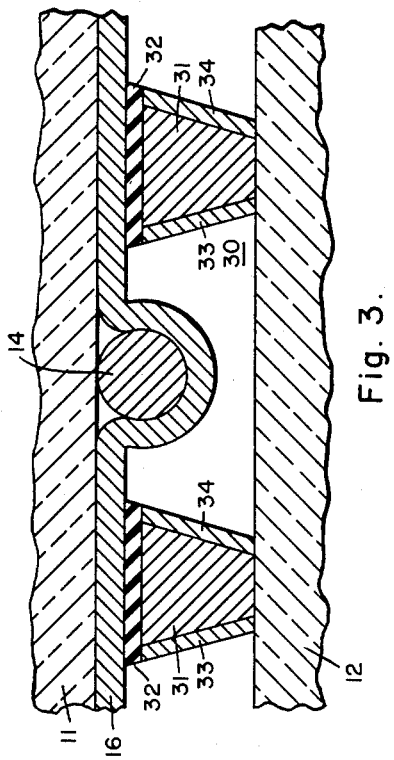
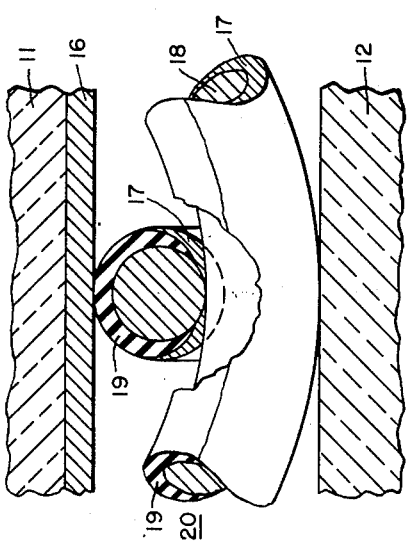

3,121,648
RADIANT ENERGY CONVERTER
Arthur S. Jensen, Baltimore, Md., assignor to Westinghouse Electric Corporation, East Pittsburgh, Pa., a corporation of Pennsylvania
Filed Apr. 29, 1960, Ser. No. 25,674
19 Claims. (Cl. 136—89)

This invention relates generally to transducers for the conversion of light to electrical energy and, more particularly, to such devices which enable the generation of power on a large scale from solar energy by the photoemission of electrons.

While in the instant application the terms "light" and "radiation" may be frequently used, it is intended in all instances that, unless otherwise specified, such expressions include invisible portions of the electromagnetic spectrum.

It has long been recognized that enormous amounts of energy are contained in optical radiation, the principal source of which is, of course, the sun. Previous work in the area of conversion of solar radiation to electrical energy has been primarily concentrated in the area of photovoltaic conversion. In devices employing the photovoltaic effect, a body of material, often belonging to the class of semiconductor materials, when bombarded by radiation forms charge carriers therein which appear as a current in an external circuit. While many significant achievements have been made in the field of photovoltaic devices, enabling such devices to be useful as radiation detectors and in some other applications as power sources, the achievement of the right combination of efficiency, weight, cost and other factors has not yet been achieved to the extent that power generation on a substantial scale is possible.

Another class of devices long known to the art is that of photoelectric tubes, such as those discussed in chapter 19 of "Vacuum Tubes," by K. R. Spangenberg, McGraw-Hill, 1948. These tubes comprise a spaced cathode and anode electron emission from the cathode being stimulated by radiant energy bombarding it. Devices of this type are limited in application by reason of the slight output derived therefrom which must generally be amplified in order to be of any use. Among the well-known applications of such devices are as door openers, counters and automatic light switches. Such devices generally have had such a limited efficiency that it has been recognized that there are serious obstacles to the adaptation of such devices to the generation of a useful amount of power.

To maximize the output of such photoemissive devices, it is necessary that the load resistance be comparable to the internal resistance of the generator itself. Since the internal resistance of such devices has been invariably quite high, a large load resistance of the order of about 10 megohms would be required to derive power and power output would be quite small. Other considerations negate the possibility of a photoelectric power generator according to conventional concepts because of the desirability of low weight, size and cost per unit of power derived.

In prior art phototubes, a large spacing between cathode and anode was required because fabrication of the cathode by evaporation techniques required shielding of the anode. Also, such devices employed cathodes which are much larger than the anode which also contributed to a large cathode-to-anode spacing. The reason for using such different sized electrodes was to have maximum light incident upon the cathode and minimum light on the anode. The large spacing between the electrodes brings about space charge limits on the current density. It has been determined that the space charge limited current density is inversely proportional to the square of the spacing between the cathode and anode. Also, the internal resistance of the device varies directly as the square of the spacing. In order that an inherently space charge limited device may operate, it is necessary to impose a positive potential on the anode relative to that of the cathode by external means in order to collect electrons. Therefore, such a device is usually a power consumer rather than a power generator.

The need for photoemissive power generation means is apparent upon consideration of the requirements of space travel and stations on the moon or in orbiting man-made satellites. Under such circumstances, the availability of electrical energy will probably be essential for survival. Obviously conventional power sources are unsuitable. It is equally obvious that for such purposes a low weight solar energy converter of even moderate efficiency would be very desirable. In addition, there are areas of the world where the absence of fossil fuels and water power make power generation most expensive. Often such areas have long periods of sunlight sufficient to make solar energy conversion a desirable process.

It is therefore an object of the present invention to provide a radiation responsive, electron emissive generator of useful amounts of electrical energy.

Another object is to provide a photoemissive power generator having a low internal impedance.

Another object is to provide a photoemissive power generator which is not space charge limited.

Another object is to provide a photoemissive power generator having low weight per unit of power derived therefrom.

Another object is to provide a photoemissive power generator which may be fabricated in a large area sheet at low cost.

Another object is to provide a photoemissive power generator capable of producing significant quantities of electric power both in terrestrial environments and beyond the earth's atmosphere.

According to the present invention, a radiation responsive power generator is provided having a cathode very closely spaced from an anode. The cathode emits electrons in response to radiation incident thereon and is, therefore, "photoemissive." However, the cathode member may be of such a nature that effects in addition to purely photoelectric emission occur, such as a thermionic effect, for example. According to another feature, means are provided to reduce the emission of electrons from the anode, for example by providing a member between the cathode and the collecting surface of the anode so that the collecting surface is shaded from incident radiant energy while still preserving the close spacing of the electrodes.

According to a further feature, the anode has on the electron collecting surface thereof a layer of material having a low work function so as to aid in reducing the internal power loss in the device. According to another feature of the invention, a vacuum envelope is provided around the photoemissive power generator being directly supported by the components therein to provide a lightweight and flexible structure which may be fabricated at low cost.

The features of the present invention which are believed to be novel are set forth with particularity in the appended claims. The present invention, both as to its organization and manner of operation, together with the above mentioned and further objects and advantages thereof, may best be understood by reference to the following description taken in conjunction with the accompanying drawings, in which:

FIGURE 1 is a partial, sectional view of a photoemissive power generator according to the present invention:

FIG. 2 is an enlarged sectional view of a small portion of the photoemissive power generator taken along the line II—II of FIGURE 1; and FIG. 3 is a partial, sectional view of a photo-emissive power generator according to an alternative embodiment of the present invention.

Referring now to FIG. 1, there is shown an evacuated envelope 10 of a light transmissive material such as glass or plastic. The envelope 10 has lateral dimensions which are many times greater than those through the device and comprises two large faces 11 and 12 which are joined by a seal 13 at their periphery. Enclosed within the envelope 10 on the inner surface of the first face 11 are conductive members 14 which may conveniently be formed by evaporation of a suitable metallic conducting material such as nickel or copper onto the inner surface of the face 11 or by use of a mesh of copper or the like having wires of approximately 2 mils diameter and a transmission of about 98%.

Next disposed on the same inner envelope surface, thereby contacting the aforesaid conducting members 14, is a layer 16 of a suitable photoemissive material, preferably having a low work function, a high quantum efficiency and a wide spectral response. A suitable material for this purpose is cesium antimonide. However, other materials may be employed such as cesium bismuthide and cesium-sodium-potassium antimonide. The photoemissive material could also be spaced from the envelope face 11 if desirable for a particular application but since ordinarily another structural member would be required for that purpose, it is generally more convenient to deposit the cathode 16 directly on the envelope face 11.

The photoemissive cathode 16 may be any material, mixture or structure which has the property of emitting electrons in response to incident radiation. Therefore the term "photoemissive" as used herein and in the appended claims broadly includes any emission response to radiation. For example, in addition to a photoelectric electron emitter as described in the particular embodiments herein, the cathode 16 may be such that upon bombardment by infrared radiation which is converted to heat it produces what is ordinarily called thermionic emission.

Adjacent the photoemissive layer or cathode 16 is a woven mesh member 18 of a suitable metallic material such as nickel or copper having on the side facing the cathode a layer 19 of insulating material such as magnesium fluoride or silicon monoxide, for example, which may be deposited thereon by evaporation in a vacuum. On the opposite surface of the mesh 18 which serves as the collecting surface of the anode 20 is a layer 17 of a low work function material which may be, for example, the same as that used as the cathode 16 of the device such as cesium antimonide or of another suitable material such as cesium-silver oxide. If a like material is used for both the cathode 16 and the collecting surface 17, they may be formed in a single operation by evaporation in a vacuum. For purposes of the ensuing discussion, it must be borne in mind that the anode 20 of the device electrically comprises the mesh 18 as well as the electron collecting surface 17 which may have a layer 17 of low work function material thereon. The second envelope face 12 is imposed against the anode and is sealed at its periphery to the first envelope face 11.

Extending through the envelope wall are two leads 22 and 23 attached to the cathode 16 and anode 20, respectively. A load impedance 24 is provided between the leads 22 and 23 and is such that it approximately matches the internal impedance of the photoemissive generator in order to maximize power generation. Useful power from the device is derived across this load impedance 24.

Referring now to FIG. 2, there is shown a portion of FIG. 1 which is much enlarged. Two wires of the mesh 18 are shown having thereon a layer 17 of low work function material and an opposing layer of insulating material 19 in direct contact with the photoemissive cathode 16. Electrons from the cathode 16 traverse nonlinear paths by which they reach the low work function surface of the anode 20. Of course, in initial operation, the layer 19 of insulating material and the surface of the opposing face 12 of the envelope 10 will be bombarded by electrons. However, these surfaces will soon charge up to a sufficient negative potential such that further electrons are repelled therefrom and are collected by the less negative anode 20.

In operation, the photoemissive power generator of FIG. 1 is disposed in a manner such that the photo-cathode 16 is exposed to light. Photoemission of electrons occurs from the cathode by excitation of electrons therein to an extent sufficient to overcome the work function of the cathode 16. Each emitted electron will travel along a trajectory depending on its initial kinetic energy and direction of emission and the local electric fields between the surfaces until it strikes a surface such as the opposing envelope face 12, the layer of insulating material 19 or the anode 20. Since charge will be retained on the envelope face 12 and on the insulating material 19, these members will charge up negatively until a certain potential is reached such that subsequent electrons are substantially repelled therefrom.

The energy which an electron in the cathode material 16 receives in excess of that needed to leave the material determines the kinetic energy of the emitted electrons. After initial transient conditions have been passed, electrons are continuously emitted from the cathode 16 and collected by the collecting surface 17 of the anode 20 to which they travel because of their kinetic energy and because of electrostatic repulsion from the charged surfaces of the insulators 12 and 19. Therefore, electrons have their maximum energy immediately upon leaving the cathode 16. Electrons reaching the anode 20 do so solely due to the initial kinetic energy acquired by reason of the incident radiation.

The close spacing between the cathode 16 and the anode 20 makes an applied collecting potential between the electrodes unnecessary. The anode collecting surface will in fact charge negatively with respect to the cathode. Such a situation does not impede operation because, in accordance with this invention, when the anode to cathode spacing is sufficiently small, the device is not space charge limited. A spacing of 2 mils is so small that solar illumination at the earth's orbit is insufficient to cause space charge limiting. The difference in potential produced across the load impedance 24 due to charging of the anode 20 negatively makes the device a source of available power. The device is of course capable of continuous operation because electrons collected by the anode 20 are passed through the load 24 in the external circuit and subsequently returned to the cathode 16.

The conducting screen 14 provided within the photocathode 16 has been found effective in reducing the internal resistance of the cathode which enables some gain in efficiency. While such a conducting screen is provided in a preferred embodiment of the present invention, it is not essential to the practice of the present invention.

The insulating layer 19 serves to space the anode 20 from the cathode 16 both electrically and mechanically and is the principal determinant of the cathode-to-anode spacing. Such a layer 19 may be formed of silicon monoxide or magnesium fluoride by well known evaporation techniques which enable the formation of a continuous layer without pinholes having a thickness of about 1 mil or less. While the cathode-to-anode spacing at which the device becomes space charge limited varies, for example, with the material employed in the photocathode, the wave length of input light, the intensity of illumination, and the electron kinetic energy, it is believed that practical devices in accordance with the present invention may be formed wherein the cathode 16 is spaced from the anode 20 by a distance up to about 2 mils.

It is therefore seen that a close spacing is achieved between the cathode 16 and anode 20 by means of separating them solely by the insulating layer 19 which may be quite thin. The insulating layer 19 serves as an electrical and mechanical spacer of the cathode and anode and, in addition, helps to shade the anode 20 from incident radiation. The insulating layer 19 thereby serves as a means of substantially preventing the emission of electrons from the anode 20. Of course, other structural elements could be imposed between the two electrodes 16 and 20. However, such additional features would generally be undesirable because they would space the elements 16 and 20 farther apart and lead to less efficient power generation. The cathode 16 and anode 20 are closely spaced over their total areas.

It is an important feature of the present invention that the close spacing between the cathode 16 and anode 20 is maintained while the collecting surface 17 of the anode 20 is shaded relative to the incident radiation. This is an essential feature in order to minimize emission of electrons from the surface 17 which would have an effect counteracting that of the electrons emitted by the cathode 16. The shading of the collecting surface 17 is provided by the conductive mesh 18 and the insulating layer 19 which lie between it and the source of radiation directed onto the cathode 16. In the event there is undesired radiation incident on the envelope face 12 adjacent the anode 20, this face may be darkened or made opaque by any suitable means to keep the anode 20 in the dark.

It is not necessary in all embodiments that the anode 20 have small dimensions but in some embodiments this is a desirable feature because it helps to provide a close cathode 16 to anode 20 spacing and to keep the anode shaded. In an embodiment wherein the anode 20 includes a woven mesh 18 having the collecting surface 17 on the surface remote from the cathode 16, the electron path length is directly affected by the diameter of the mesh wires. Therefore the mesh wires of the device shown in FIGS. 1 and 2 should have a diameter of about 1 mil or less.

The photoemissive material used as the cathode 16 of the device should preferably have a low work function and a high quantum efficiency, that is, incident radiation should be able to excite numerous electrons from the conduction band of the cathode material into the vacuum surrounding the cathode 16. A more direct effect on energy conversion is had by the work function of the anode collecting surface 17 which should be low so that power lost in the form of heat is kept to a minimum. The quantum efficiency of the anode collecting surface 17 should, however, also be low. Under such circumstances, electrons emitted by the cathode do not have to give up much energy upon reaching the anode surface 17 because of the low work function of the anode. Also, stray radiation will not produce significant electron emission from the anode 20 because of the low quantum efficiency of its exposed surface 17. This situation occurs in a material wherein the conduction band is not greatly populated by electrons but is relatively close to the vacuum level. Such a material is cesium-silver-oxide which has a work function of only about 1.1 electron-volts. In general, the anode collecting surface 17 should have a work function of about 3 electron volts or less. Therefore, the work function is approximately equal to or less than the work function of the cathode which comprises any good photoemitter.

An early model of a device having a construction like that shown in FIGS. 1 and 2 has been built wherein a matched load of about 3,500 ohms was provided giving an output power of 4.9 micro-watts. While this represents an efficiency of about 0.5% when compared with an input power of 1 milliwatt, it must be remembered in such considerations that an essentially free source of energy is available in the form of sunlight for the operation of such a power generator.

Referring now to FIG. 3, there is shown a photoemissive power generator according to another embodiment of the present invention. Here the envelope faces 11 and 12 and cathode 16 are substantially as shown in FIG. 1. The cathode 16 may, if desired, be provided with a conducting screen 14 similar to that shown in FIG. 1. The anode 30, rather than having a woven mesh 18 as in FIG. 1, comprises conducting members 31 having a trapezoidal cross section. The anode structure 30 may comprise a plurality of parallel members 31, as shown, or be in the form of a grid or any other suitable configuration. The anode 30 is separated from the cathode 16 by a layer 32 of insulating material which may be formed like the layer 19 of FIG. 1. It is seen that electrons from the cathode 16 will strike the non-parallel walls 33 and 34 of the anode 30 which are shaded from incident radiation due to the geometry employed and which may comprise a layer of low work function material such as that employed for layer 17 shown in FIGS. 1 and 2. Certain advantages may be obtained by the structure of FIG. 3 in that there is no necessary limitation on the size of the anode structure 30 because the close anode-to-cathode spacing is preserved even though the conducting members 31 may be quite large. Such a structure may enable easier fabrication and other advantages over that employing a fine mesh as shown in FIG. 1.

Other modifications of the structure of FIG. 1 can be employed in accordance with particular applications. In some instances, it is desirable to provide an additional member to space the anode 20 from the envelope wall 12 on the dark side of the device. The purpose of such extra member is to permit electrons from the cathode 16 to arrive at the anode surface 17 without being prevented by the build up of a large negative charge on the envelope wall 12.

In accordance with the present invention, the envelope 10, of both FIGS. 1 and 3, need not be self-supporting but may actually be supported by the anode 20 or 30. This enables the use of a very fine film of glass or plastic for the envelope which is flexible and which enables the formation of the generator in any particularly desired shape. For example, it may be desirable to form the generator in a spherical shape or other shapes having curved surfaces.

Because a device in accordance with the present invention is not space charge limited, the residual pressure within the envelope may be somewhat greater than that generally used in vacuum tube practice. Internal pressures up to about 1 micron of mercury are believed not substantially to affect the device's operation. Because of this fact and also the fact that the envelope may be substantially supported by components therein, demands upon the envelope are not stringent. A suitable lightweight and flexible device may be made using an envelope of a glass-plastic laminate formed of alternate layers of glass sold under the trade name Micro-Sheet Glass by Corning Glass Works and a fluorocarbon polymer film such as Teflon. A device having such an envelope may have a total thickness of only about 30 mils and may have a specific weight of only about 30 pounds per kilowatt which is quite low compared with photovoltaic devices.

While the present invention has been shown in a few forms only, it will be obvious to those skilled in the art that it is not so limited, but is susceptible to various changes and modifications without departing from the spirit and scope thereof.

I claim as my invention:

1. A power generator comprising a radiation responsive cathode exposed to incident radiation, an anode to collect electrons emitted by said cathode, means to maintain said cathode and said anode in closely spaced and electrically insulated relationship over their total area, means for shading substantially all of said anode from said incident radiation to prevent the emission of electrons from said anode and means to derive an electrical power output across said cathode and said anode.

2. A power generator comprising a radiation responsive cathode exposed to incident radiation, an anode to collect electrons emitted by said cathode, means comprising a layer of insulating material to maintain said cathode and said anode in closely spaced and electrically insulated relationship over their total area and substantially to shade all of said anode from incident radiation and means to derive an electrical power output across said cathode and said anode.

3. A photoelectric power generator comprising a photoemissive cathode exposed to incident radiation, an anode having a collecting surface for electrons from said cathode and an insulating layer to maintain said cathode and said anode in closely spaced and electrically insulated relationship over their total area and substantially shade all of said collecting surface of said anode from incident radiation.

4. A power generator comprising a cathode emissive of electrons in response to incident radiation which have a kinetic energy upon leaving said cathode, an anode, means to maintain said cathode and said anode in a closely spaced relationship to each other so that the electrons emitted by said cathode travel to said anode solely due to said kinetic energy, means for shading substantially all of said anode from said incident radiation, and means to derive an electrical power output across said cathode and said anode.

5. A power generator comprising a cathode emissive of electrons in response to incident radiation which have a kinetic energy upon leaving said cathode, an anode, means to maintain said cathode and said anode in a closely spaced relationship to each other over their total area so that the electrons emitted by said cathode travel to said anode solely due to said kinetic energy, means for shading substantially all of said anode from said incident radiation, and means to derive an electrical power output across said cathode and said anode.

6. A power generator comprising a cathode emissive of electrons in response to incident radiation which have a kinetic energy upon leaving said cathode, an anode, means comprising a thin layer of insulating material in contact with said cathode and said anode to maintain said cathode and said anode in close relationship to each other over their total area so that the electrons emitted by said cathode travel to said anode solely due to said kinetic energy and to substantially shade all of said anode from incident radiation, said spacing between said cathode and said anode being sufficiently small to prevent space charge limiting, and means to derive an electrical power output across said cathode and said anode.

7. A photoelectric power generator comprising an evacuated envelope having therein a photoemissive cathode deposited on an inner surface of said envelope and exposed to incident radiation, an anode having a collecting surface, and an insulating layer to maintain said cathode and said anode in closely spaced and electrically insulated relationship over their total area and substantially shade all of said collecting surface from incident radiation, said spacing between said cathode and said anode being sufficiently small to prevent space charge limiting.

8. A photoelectric power generator comprising an evacuated envelope having lateral dimensions many times the transverse dimensions thereof and having therein a photoemissive cathode deposited on one large area inner surface of said envelope and exposed to incident radiation, an anode having a collecting surface, and an insulating layer to maintain said cathode and said anode in closely spaced and electrically insulated relationship over their total area and to substantially shade all of said collecting surface of said anode from incident radiation, said spacing between said cathode and said anode being sufficiently small to prevent space charge limiting.

9. A photoelectric power generator comprising a metallic mesh having a layer of insulating material on one surface thereof, a first envelope surface having a layer of photoemissive material thereon supported by said metallic mesh member on the surface thereof having said insulating layer and a second envelope surface supported by said metallic mesh member on the surface thereof opposite said insulating layer, said insulating layer maintaining said cathode and said anode in closely spaced and electrically insulated relationship over their total area, said first and second envelope surfaces being sealed at their periphery and having conductive leads from said photoemissive layer and said metallic mesh extending therethrough.

10. A photoelectric power generator comprising an evacuated envelope having opposing large area envelope faces of a flexible material, a conducting screen disposed on the inner surface of one of said envelope faces, a photoemissive cathode disposed in a large area layer in contact with said first envelope face and said conducting screen, an anode comprising a metallic mesh structure having on the surface thereof facing said first envelope face a layer of insulating material having a thickness of about 1 mil or less, said metallic mesh having on the surface thereof facing said second envelope face a layer of electron collecting material having a low work function, said anode structure substantially supporting said envelope faces, said envelope faces sealed at their periphery and having extending therethrough conductive leads to said cathode and said anode, said conductive leads applied across a load impedance approximately equal to the internal impedance between said cathode and said anode, and means to derive useful power from across said load impedance.

11. A photoelectric power generator comprising a photoemissive cathode exposed to incident radiation, an anode having an electron collecting surface substantially entirely shaded from incident radiation, and means for closely spacing said anode a distance from said cathode so that electrons emitted by said cathode are collected by the collecting surface of said anode while said surface is at a potential negative with respect to that of said cathode.

12. A photoelectric power generator comprising a photoemissive cathode exposed to incident radiation, an anode having an electron collecting surface substantially entirely shaded from incident radiation, means including a layer of insulating material for closely spacing said anode from said cathode so that electrons emitted by said cathode are collected by the collecting surface of said anode while said surface is at a potential negative with respect to that of said cathode.

13. A photoelectric power generator comprising a photoemissive cathode exposed to incident radiation, an anode having an electron collecting surface substantially entirely shaded from incident radiation, a layer of material disposed on said electron collecting surface having a low work function, and means including a layer of insulating material for closely spacing said anode from said cathode so that electrons emitted by said cathode are collected by the collecting surface of said anode while said surface is at a potential negative with respect to that of said cathode, said spacing between said cathode and said anode being sufficiently small to prevent space charge limiting.

14. A photoelectric power generator comprising a photoemissive cathode exposed to incident radiation, an anode comprising a conductive member having an electron collecting surface substantially shaded entirely from incident radiation, said electron collecting surface having thereon a layer of material having a work function approximately equal to or less than the work function of said photoemissive cathode, a layer of insulating material closely spacing said anode from cathode so that electrons emitted by said cathode are collected by the collecting surface of said anode while said surface is at a potential negative with respect to that of said cathode.

15. A photoelectric power generator comprising a light transmissive envelope having a photoemissive cathode disposed on a first inner surface thereof, an anode comprising a conductive member having an electron collecting surface substantially entirely shaded from incident radiation, a layer of insulating material disposed on said conductive member to closely space said anode from said cathode so that electrons emitted by said cathode are collected by the collecting surface of said anode while said surface is at a potential negative with respect to that of said cathode, said envelope comprising a flexible material substantially supported by said anode.

16. A photoelectric power generator comprising a photoemissive cathode exposed to incident radiation, an anode comprising a conductive member having an electron collecting surface substantially shaded from incident radiation, and having thereon a layer of a material of a work function approximately equal to or less than the work function of said cathode, an insulating layer disposed on said conductive member in contact with said cathode to closely space said anode from said cathode so that electrons emitted by said cathode are collected on the collecting surface of said anode while said surface is at a potential negative with respect to that of said cathode, conductive members extending from said cathode and said anode coupled across a load impedance approximately matching the internal impedance between said cathode and said anode.

17. A photoelectric power generator comprising a photoemissive cathode exposed to incident radiation, an anode comprising a conductive member having an electron collecting surface substantially shaded from incident radiation, said electron collecting surface having thereon a layer of a material having a work function of about 3 electron volts or less, an insulating layer of a thickness of about 1 mil or less disposed on said conductive member in contact with said cathode to space said electron collecting surface from said cathode a distance of about 2 mils or less so that electrons emitted by said cathode are collected on said collecting surface while said surface is at a negative potential with respect to that of said cathode, first and second conductive members extending from said cathode and said anode, respectively, and coupled across a load impedance approximately matching the internal impedance between said cathode and said anode.

18. A photoelectric power generator comprising a radiation transmissive envelope having a photoemissive cathode disposed on one internal surface thereof, an anode comprising a conductive member having an electron collecting surface substantially shaded from incident radiation and having thereon a layer of material having a work function of about 3 electron volts or less, a layer of insulating material of a thickness of about 1 mil or less disposed on said conductive member and in contact with said cathode to space said anode from said cathode a distance of about 2 mils or less so that electrons emitted by said cathode are collected on said collecting surface while said surface is at a negative potential with respect to that of said cathode, said envelope comprising flexible material substantially supported by said anode, first and second conductive members attached to said cathode and said anode respectively and extending through said envelope and applied across a load impedance approximately equal to the internal impedance between said cathode and said anode.

19. A photoelectric power generator comprising a radiation transmissive envelope having one or more conducting elements disposed on one internal surface thereof, a photoemissive cathode disposed on said inner surface in contact with said conductive elements, an anode comprising a conductive member having an electron collecting surface substantially shaded from incident radiation and having thereon a layer of material of a work function of about 3 electron volts or less and a low quantum efficiency, a layer of insulating material of a thickness of about 1 mil or less to space said electron collecting surface from said cathode by a distance of about 2 mils or less so that electrons emitted by said cathode are collected on said collecting surface while said surface is at a negative potential with respect to that of said cathode, said envelope comprising flexible material substantially supported by said anode, first and second conductive members attached to said cathode and said anode extending through said envelope and applied across a load impedance substantially equal to the internal impedance between said cathode and said anode.

References Cited in the file of this patent

UNITED STATES PATENTS

| | | |
|---|---|---|
| 1,956,590 | Pressler | May 1, 1934 |
| 2,506,625 | Wooley | May 9, 1950 |
| 2,739,084 | Sommer | Mar. 20, 1956 |
| 2,888,372 | Feibelman et al. | May 26, 1959 |
| 2,894,167 | Day | July 7, 1959 |
| 2,980,819 | Feaster | Apr. 18, 1961 |